Sept. 13, 1932.    P. J. FOBERT ET AL    1,876,899
GRINDING OR CUTTING MACHINE
Filed Aug. 15, 1930    3 Sheets-Sheet 1

INVENTOR
Phillip J. Fobert &
BY Adrien J. Ducharme

ATTORNEYS
Barnes + Kisselle

Sept. 13, 1932.     P. J. FOBERT ET AL     1,876,899
GRINDING OR CUTTING MACHINE
Filed Aug. 15, 1930     3 Sheets-Sheet 2

INVENTOR
Phillip J. Fobert &
BY  Adrien J. Ducharme
ATTORNEYS.
Barnes + Kisselle Sept. 13, 1932.   P. J. FOBERT ET AL   1,876,899
GRINDING OR CUTTING MACHINE
Filed Aug. 15, 1930   3 Sheets-Sheet 3

INVENTOR
Phillip J. Fobert &
BY  Adrien J. Ducharme

ATTORNEY
Barnes & Kisselle

Patented Sept. 13, 1932

1,876,899

UNITED STATES PATENT OFFICE

PHILLIP J. FOBERT AND ADRIEN J. DUCHARME, OF DETROIT, MICHIGAN, ASSIGNORS TO DETROIT ALUMINUM & BRASS COMPANY, OF DETROIT, MICHIGAN, A CORPORATION OF MICHIGAN

GRINDING OR CUTTING MACHINE

Application filed August 15, 1930. Serial No. 475,490.

This invention relates to a machine the function of which may be either in the nature of a cutting or grinding operation upon a piece of work, and in which the grinding or cutting operation is preferably brought or performed to a given or determined location.

The machine is advantageous for use in connection with bearing or bearing halves and the machine will be described in connection with a bearing, but its use is not so limited. The particular machine shown herein is one wherein an abrading wheel is moved into abrading engagement with a bearing half.

Figures 1, 5:
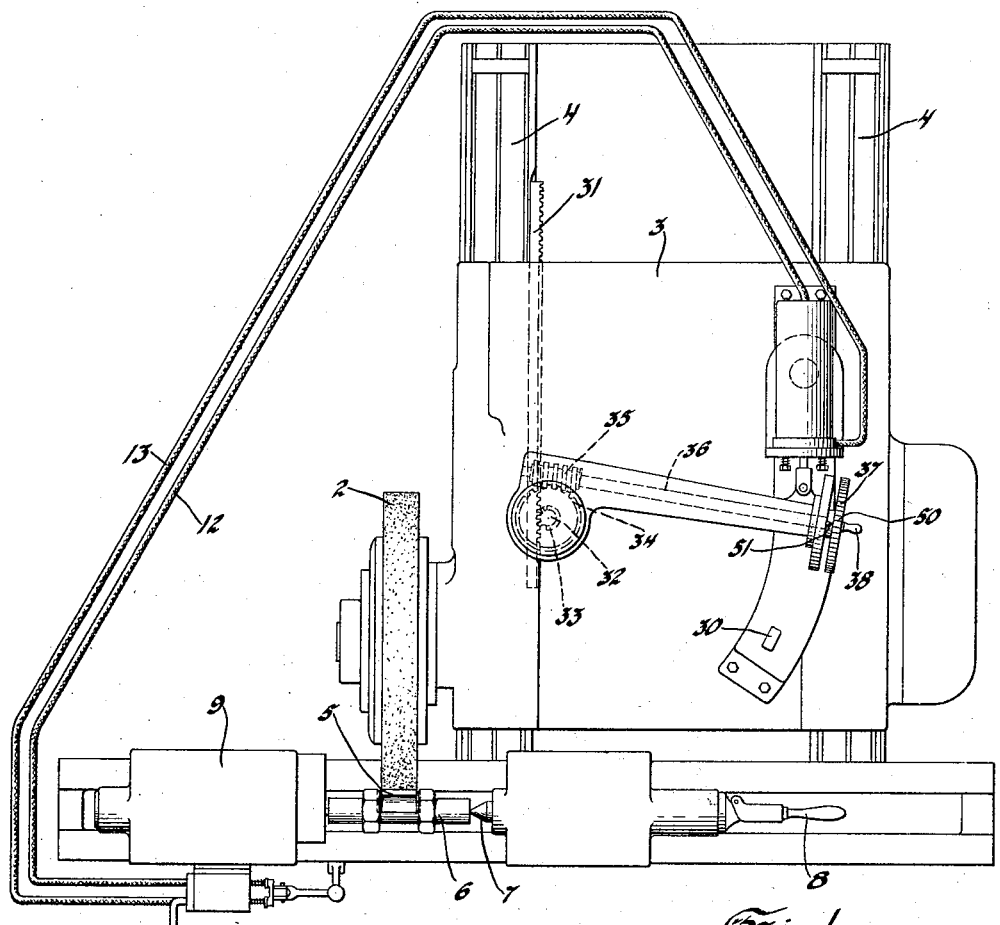
Fig. 1 is a top plan view of the machine of the type mentioned.
Fig. 5 is a detail partly in section showing an operating air cylinder.
Figure 2:
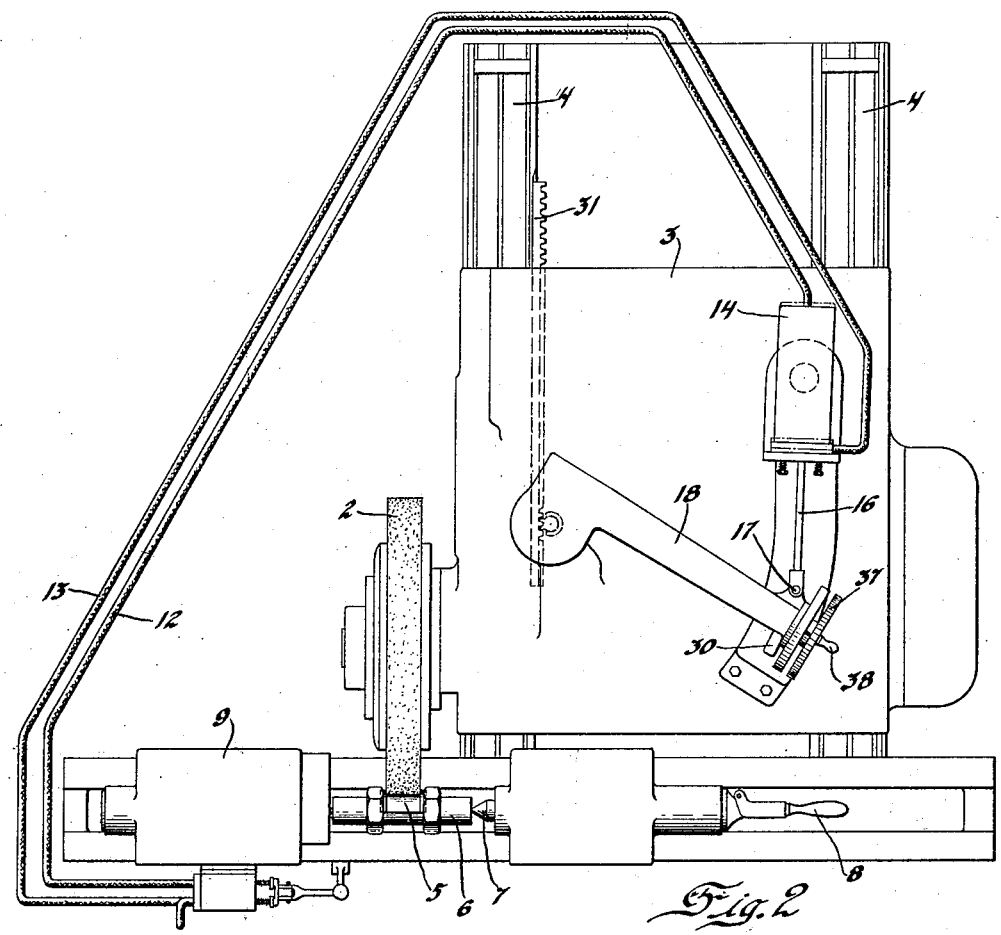
Fig. 2 is a similar view illustrating the wheel moved into abrading position.
Figure 3:
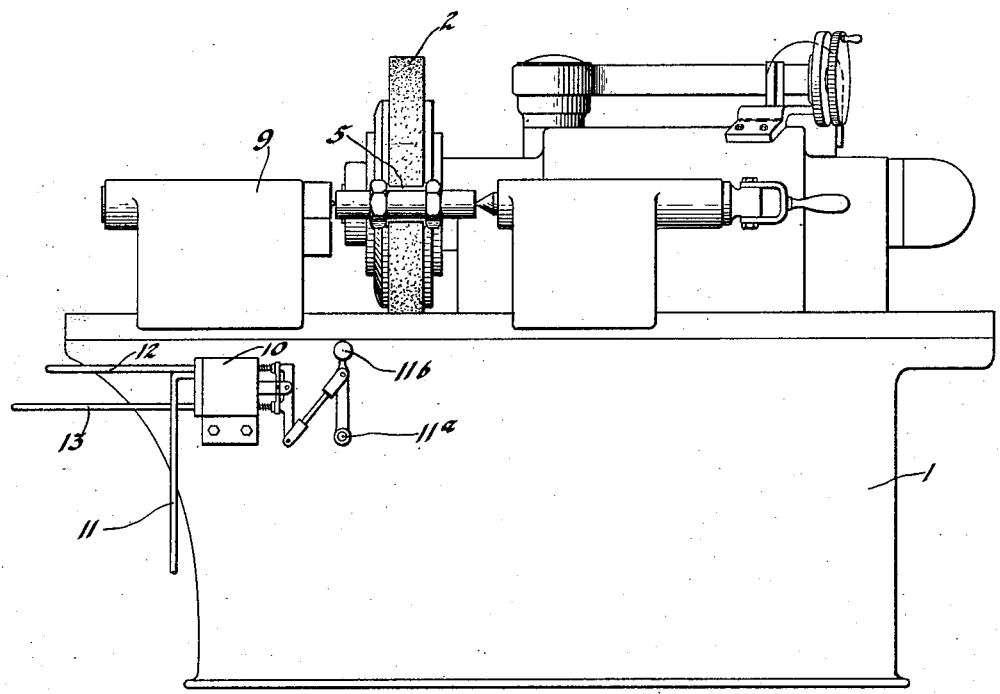
Fig. 3 is a side elevational view illustrating the side of a machine where an operator may advantageously be located.

The machine comprises a suitable base 1 provided with an abrading wheel 2 rotated by suitable power means not shown. This wheel is mounted upon a movable table 3 which is reciprocable on guideways or tracks 4. Suitable means are provided for holding a piece of work so that it can be engaged by the abrading wheel and the work may be a bearing half as illustrated at 5. Work-supporting means, as at 6, is provided to permit of quickly placing the same in the machine with the work thereon, and it may be held on its axial center by plunger 7 which may be retracted through the means of a handle 8, and suitable driving means therefor is located in housing 9. The driving means may be hydraulic, but this forms no essential part of the invention as any type of driving means may be provided. Suffice to say that there is rotatable means for holding the bearing. After an operator places a bearing in the machine the same is caused to rotate, and at this time the abrading wheel 2 moves into engagement and performs its function upon the bearing half. The machine may be controlled in a very simple way, as for example, by means of control valve 10 actuated by handle 11b.

There is an air supply line 11 leading to the valve, and air supply lines 12 and 13 leading to opposite ends of a cylinder 14. For example, line 12 may lead into the end of the cylinder as shown in Fig. 5, and line 13 to the opposite end, and preferably the lines 12 and 13, especially where they connect with the cylinder are flexible because the cylinder has a rocking movement, as will later be pointed out. Within the cylinder is a piston 15 connected to a piston rod 16 pivotally connected as at 17 with an arm 18. The cylinder is carried by a bracket 20 and the cylinder head 21 has posts 22 extending through apertures in the bracket with springs 23 interposed between the bracket 20 and nuts 24 on the ends of the posts. This permits the cylinder to move in a direction away from the bracket with a compressing action of the springs. A stop 30 is provided for limiting positively the movement of the arm 18. The movement of the arm 18 causes the table 3 to reciprocate upon its guideways, and this is accomplished through the following means:

A rack 31 is fixed to the machine support while a spindle 32 is carried by the table 3 having a small gear 33 meshing with the rack; also on the spindle is a larger gear 34 which is a worm gear meshing with a worm 35 fixed to the end of a shaft 36 journaled in the arm 18. At the outer end of the arm a manual control for the shaft is provided in the form of a wheel or disk mounted thereon provided with a handle 38.

Figure 4:
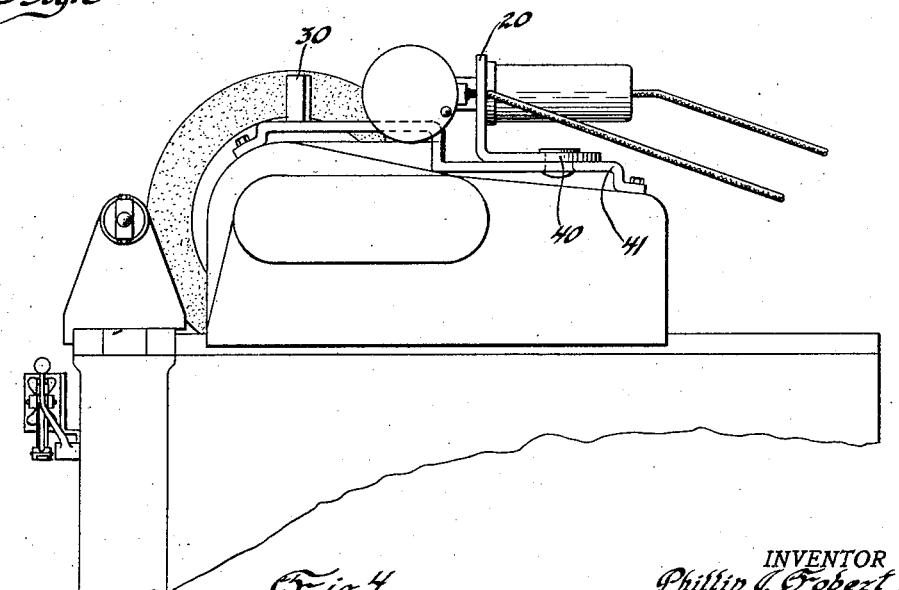
Fig. 4 is a side elevational view of part of the machine taken from the right hand side of Fig. 3.

By referring to Fig. 4 it will be noted that the bracket 20 which supports the cylinder is pivotally mounted, as at 40, on a supporting element 41 which supporting element may also carry the stop 30. With this construction the cylinder is permitted to rock upon its mounting 41 which is necessary because of the fact that the outer end of the piston rod, as at the point 17, moves in an arc around the spindle 32 of the arm 18.

With this construction it will be appreciated that as an operator grasps the handle 38 and rotates it that the table 3 is reciprocated by reason of the small gear 33 traveling on rack 31 thus to feed the abrading wheel 2 toward and away from the work. It will also be noted that if the handle 38, shaft 36, and worm 35 be held or permitted not to rotate, and the arm 18 bodily rocked around the pintle 32, then the small gear 33 is turned with the spindle also resulting in movement of the table as the small gear 33 travels along the rack 31. The machine is at rest in the position shown in Fig. 1. A bearing half is placed on the holder element 6 substantially in the position shown in Fig. 1, and then the operator manipulates handle 11b. This starts the workholder element to rotate as by means of a suitable control device (not shown) but located within the housing 1 on shaft 11a. At the same time the valve 10 is positioned so as to supply air through the conduit 12 into the cylinder 14. This forces the piston toward the other end of the cylinder and rocks the arm 18 thus moving the table which carries the abrading wheel up to the work. The abrading wheel is moved up to an accurate line, as determined by the stop 30. After the half bearing has been abraded the air is reversed so that the same enters the cylinder through conduit 13 thus bringing the parts back to the position shown in Fig. 1 and completing the cycle.

A cushioning action is desired when the arm strikes the stop 30. However the stop and the arm themselves cannot be very well arranged with the cushion because the same would destroy the accurate position of the abrading element, and so the cylinder is cushioned through the means of the springs 22. When the arm strikes the stop 30 and comes to an abrupt stop the continued air pressure backs away the cylinder; that is to say, the cylinder head 21 is forced away from the bracket 20 thus compressing the springs and the air then holds the abrading wheel up to its working position. Moreover, the working position of the abrading wheel can be adjusted to a nicety by rotating the shaft 36 through the means of the crank 38. When this is done the position of the table and the abrading wheel is shifted with respect to the work so that the movement of these parts as effected by the air which remains substantially constant causes the wheel to move to a different working position. For aiding in this, the wheel 37 may be provided with a suitable series of gauging marks 50, which in conjunction with a stationary pointer 51 may be employed to adjust the working position of the abrading element.

We claim:

1. A machine substantially for the purpose described comprising rotatable means for holding a piece of work, an abrading or other tool for acting upon the work, a shiftable support for the tool, an air cylinder with a piston therein, means moved by the piston to shift the support, a stop for said means for accurately determining the working position of the tool, and a cushioned mounting for the cylinder.

2. A machine substantially for the purpose described comprising rotatable means for holding a piece of work, an abrading or other tool for acting upon the work, a shiftable support for the tool, an air cylinder with a piston therein, means moved by the piston to shift the support, a stop for said means for accurately determining the working position of the tool, and a cushioned mounting for the cylinder, said cushioned mounting comprising springs which permit the cylinder to back away from the piston therein when said means strikes the stop.

3. A machine substantially for the purpose described comprising rotatable means for holding a piece of work, an abrading tool or the like, a shiftable support for the tool, means comprising an arm rocking around a center point for shifting the support, an air cylinder, a piston therein, a piston rod connected to the arm, a positive stop for the arm, and a cushion mounting for the cylinder.

4. In a machine substantially for the purpose described, an abrading tool or the like, a shiftable table for supporting the same, a fixed gear rack, a pinion carried by the table meshing with the gear rack, an arm associated with the pinion, manually controlled means for rotating the pinion to shift the table, means for swinging said arm for shifting the table, said last named means comprising an air cylinder and piston one of which is connected to the arm, a cushion mounting for the other, and a pivotal mounting for the air cylinder and piston for accommodating an arcuate movement in the swing of the arm.

5. In a machine substantially for the purpose described, a tool for actuating upon a piece of work, a shiftable table supporting the same, a fixed rack, a pintle carried by the table, a gear thereon meshing with the rack, an arm swingable around the pintle, a shaft in the arm, a worm gear connection between the shaft and the pinion, means for rotating the shaft manually, power means for rocking the arm, a positive stop for limiting arm movement, means cushioning the power means when the arm is limited by the stop, said shaft being rotatable to determine the working position of the tool relative to the position determined by said stop.

In testimony whereof we affix our signatures.

PHILLIP J. FOBERT.
ADRIEN J. DUCHARME.